United States Patent

Qualich

[15] 3,646,668

[45] Mar. 7, 1972

[54] METHOD OF MAKING A PLATED WIRE MEMORY USING A SHEET OF FILM ADHESIVE

[72] Inventor: Amedeo Qualich, Rochester, N.Y.

[73] Assignee: Stromberg-Carlson Corporation, Rochester, N.Y.

[22] Filed: July 8, 1969

[21] Appl. No.: 839,879

[52] U.S. Cl. ..................29/604, 340/174 PW, 340/174 MA, 340/174 VA

[51] Int. Cl. ..........H01f 7/06

[58] Field of Search ..............29/604; 340/174 PW, 174 MA, 340/174 VA

[56] References Cited

UNITED STATES PATENTS

| | | | |
|---|---|---|---|
| 3,332,817 | 7/1967 | Obenhaus | 156/313 |
| 3,412,354 | 11/1968 | Sattler | 336/205 |
| 3,448,514 | 6/1969 | Reid et al. | 29/604 |
| 3,513,538 | 5/1970 | Bryzinski | 29/604 |

*Primary Examiner*—Charlie T. Moon
*Assistant Examiner*—Carl E. Hall
*Attorney*—Charles C. Krawczyk

[57] ABSTRACT

An array of parallel spaced insulating lands are cast on a thin sheet of insulating material having spaced parallel conductive strips so that the lands and strips are mutually perpendicular. The lands define a plurality of parallel grooves for receiving magnetic memory wires. A film adhesive of semicured epoxy is placed on the lands to extend across the grooves. A second such insulating sheet is placed over the film adhesive with its conductive strips in parallel registration with the conductive strips on the first sheet. The combination is then processed so that the film adhesive bonds the second insulating sheet to the lands.

10 Claims, 8 Drawing Figures

AMEDEO QUALICH
*INVENTOR.*

*BY* Charles C. Krawczyk

ATTORNEY

AMEDEO QUALICH
INVENTOR.

BY Charles C. Krawczyk
ATTORNEY

AMEDEO QUALICH
INVENTOR.

BY Charles C. Krawczyk
ATTORNEY

METHOD OF MAKING A PLATED WIRE MEMORY USING A SHEET OF FILM ADHESIVE

BACKGROUND OF THE INVENTION

This invention relates to magnetic memories in general, and more particularly, to novel arrays of thin film magnetic memory wires and methods of making them.

This application is an improvement over the following copending applications assigned to the assignee of the present patent application:

Ser. No. 699,672, entitled "Filamentary Magnetic Memory And Methods Of Making It Using Flexible Sheet Material" filed on Jan. 22, 1968, now U.S. Pat. No. 3,501,830 for Thaddeus F. Bryzinski and Larry L. Launt.

Ser. No. 699,673, entitled "Filamentary Magnetic Memory And Methods Of Making It Using Rigid Printed Circuit Cards" filed on Jan. 22, 1968, now U.S. Pat. No. 3,513,538 for Thaddeus F. Bryzinski.

There has been a great deal of recent interest in thin film magnetic memory devices of the type including filamentary magnetic memory wires such as wires coated with a thin film outer coating of magnetic material. Such memory wires are typically about 0.005 inch in diameter, and the thin film magnetic material is typically about one micron thick. The memory wires are generally mounted in a parallel planar array between two layers of insulating material including parallel conductors (generally called word straps) that extend around the memory wires in a direction orthogonal to the wires to form a matrix. In the interest of space conservation, it is desirable to space the memory wires as closely together as possible. Furthermore, it is important to achieve a high degree of uniformity in the spacing between successive memory wires, otherwise variations in magnetic coupling may occur between the wires and crossing conductors at different points therebetween may tend to introduce errors into the system.

In accordance with the methods of making the plated wire memory devices set forth in the above-mentioned copending applications, opposing insulating sheets are bonded together with removable nonstick type of filaments in place of the memory wires. The removable filaments are selected to be of a material resistant to the adhesive action of the bonding agent, and are of slightly larger diameter than the memory wires. After the bonding agent is cured the removable filaments are withdrawn. The memory wires are then inserted into the tunnel apertures left by the removal of the filaments. Since the thickness of insulation between the memory wires and the word straps is kept as low as possible for better magnetic coupling, the insertion of the wire into the tunnel apertures may remove some of the insulation and cause an undesirable short circuit between the memory wire and the word strap. The methods of making such plated wire memories would be simplified if the tunnel structure could be formed without the use of removable nonstick filaments and/or the memory wires could be inserted into position before bonding.

It is, therefore, an object of this invention to provide a method of making plated wire memory devices without the use of removable filaments to provide openings into which memory wires are to be inserted.

It is also an object of this invention to provide a method of making plated wire memory devices that is particularly adaptable to mass production techniques.

It is also another object of this invention to provide a method of making plated wire memory devices wherein the memory wires can be inserted into the memory devices prior to complete assembly and still allow for the ready removal of such memory wires in case of defects.

It is still a further object of this invention to provide a plated wire memory device including a film adhesive for bonding the memory device together.

BRIEF DESCRIPTION OF THE INVENTION

In accordance with the invention, a plurality of spacers are arranged in a parallel planar array between two insulating sheets of material. Each sheet has a plurality of conductive strips and are arranged so that the strips are in parallel alignment and face each other and lie at right angles with the axis of the spacers. The spacers are bonded directly to one sheet, and bonded to the other sheet by a curable film adhesive of the type wherein its dimensions do not significantly change during its curing process, such as semicured epoxy. The film adhesive passes over the grooves between the spacers to provide tunnellike passages for receiving and holding magnetic memory wires. The sheets of insulating material may be either flexible or rigid. If flexible, a single sheet can be folded over to function as the two sheets. Arrangements are made to make electrical connections to the conductive strips on the insulating sheets and to the memory wires.

In accordance with one method of the invention, the memory wires are placed in the grooves between the spacers prior to the application of the film adhesive. In accordance with a second method of the invention, the film adhesive is applied and the assembly cured to provide tunnellike passageways, and the memory wires are subsequently inserted into the established passageways.

DESCRIPTION OF THE PREFERRED EMBODIMENTS

Figure 1:
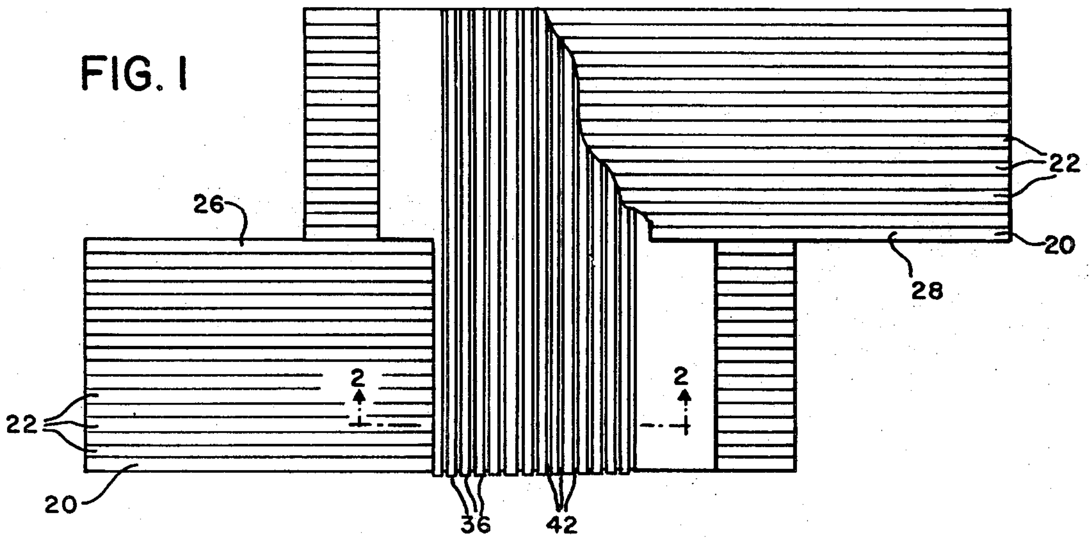
FIG. 1 is a plane view illustrating one step in the manufacture of a plated wire memory device according to the invention.
Figure 2:
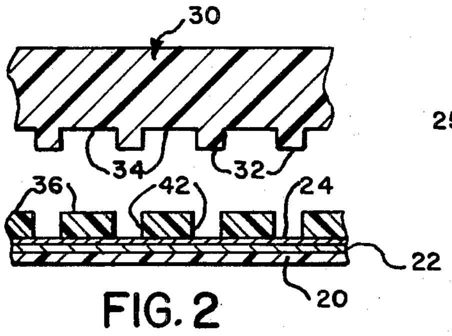
FIG. 2 is a cross-sectional view taken along the line 2—2 of FIG. 1, and showing the mold used to cast insulating lands.

The initial starting material for the plated wire memory device is a sheet 20 of flexible insulating material, such as a synthetic resin commercially available under the trade name Mylar, having strips 22 of a conductive material such as copper foil bonded to one surface in close parallel array (FIG. 1). Typically, the sheet 20 is about 0.001 inch thick, and the strips 22 are about 0.025 inch in width, spaced on about 0.05 inch centers, and about 0.0014 inch thick. A coating 24 of an insulating material is applied over the conductive strips 22. This may be conveniently done, for example, by electroplating a synthetic resin, which process facilitates accurate control of the thickness of the coating, preferably about 0.0005 inch thick. The sheet 20 is laid upon a support (not shown) with the surface bearing the conductive strips 22 facing up. It is cut, as shown, with diagonally opposed, laterally projecting tab portions 26 and 28.

A mold 30 is prepared of a resinous material such as polystyrene, having a striated surface comprising lands 32 separated by grooves 34, the lands being of generally square cross section. In the case where the array is to include magnetically coated filaments about 0.005 inch in diameter, the lands 32 are made about 0.008 inch on a side, and the grooves 34 about 0.017 inch wide. A selected area of the upwardly facing surface of the insulating sheet 20 centrally disposed between the tab portions 26 and 28 is then coated with a hardenable insulating material such as, for example, a liquid monomer of an epoxy resin. The mold 30 is then pressed upon the surface in accurately predetermined alignment, with the lands 32 and grooves 34 of the mold normal to the conductive strips 22 on the insulating sheet. The lands 32 displace the liquid resin from those areas of the insulating sheet they contact, and the liquid resin substantially completely fills the grooves 34 of the mold. Excess resin is cleared away, and that remaining under the mold 30 is cured. The mold 30 is then removed without dislodging the resin just cured on the sheet. The resin cured in the grooves of the mold forms lands 36 which are bonded to insulating resin layer 24.

In accordance with a first embodiment of the invention, the magnetic memory wires 40 are placed in the grooves 42 between the lands 36. The memory wires can be coated with a silicone mold release agent prior to placement into the grooves. Care should be taken not to have any release agent on the top portion of the lands. The release agent will act as a lubricant for later removal of the memory wires after complete fabrication, should a wire prove faulty. In the typical case where the wires have a diameter of 0.005 inch, the grooves 42 are about 0.008 inch in depth and width.

Figure 4:
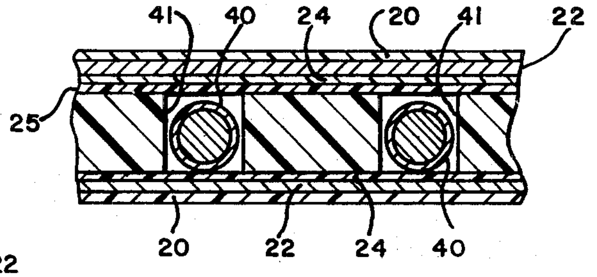
FIG. 4 is a cross-sectional view, on an enlarged scale, of the laminate shown in FIG. 3 taken along the line 4—4.
Figure 3:
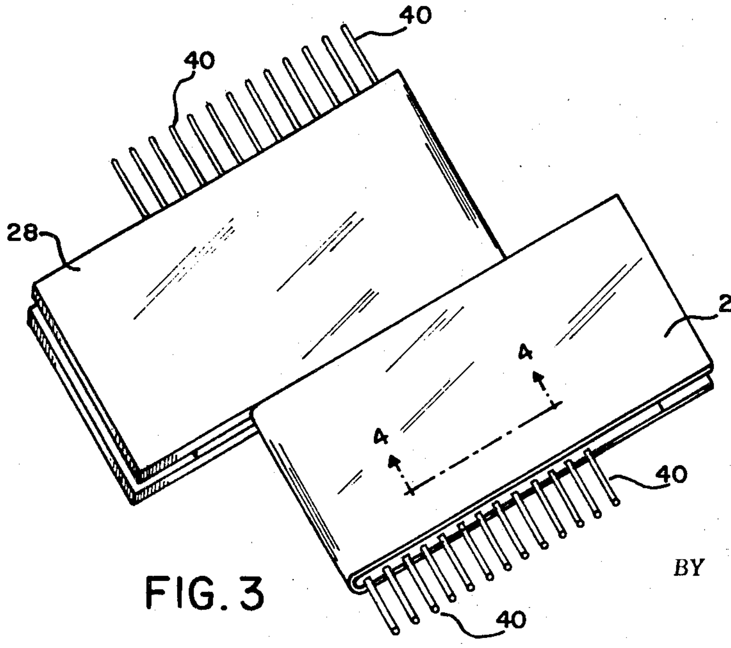
FIG. 3 is an isometric view illustrating another step in the manufacture of the memory device.
Figure 6:
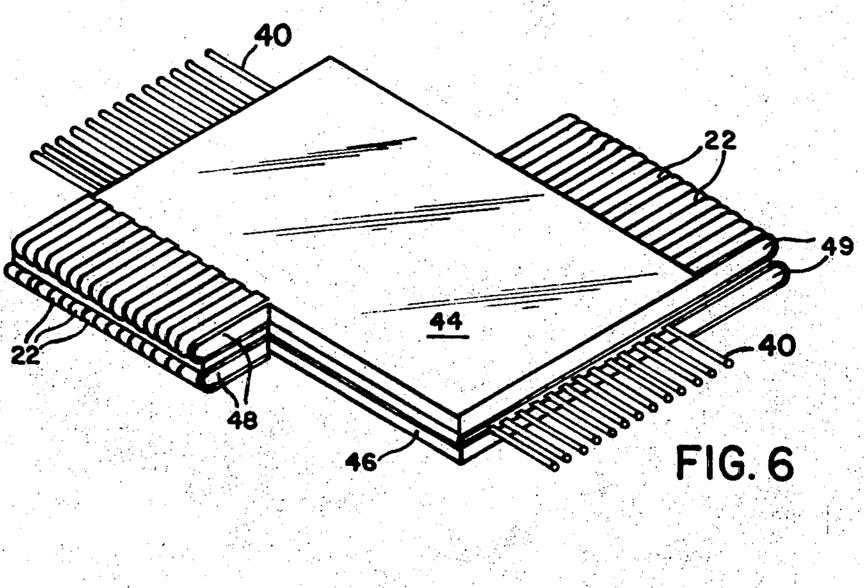
FIG. 6 is an isometric view generally similar to the view of FIG. 3, but showing the device in an advanced stage of manufacture.
Figure 7:
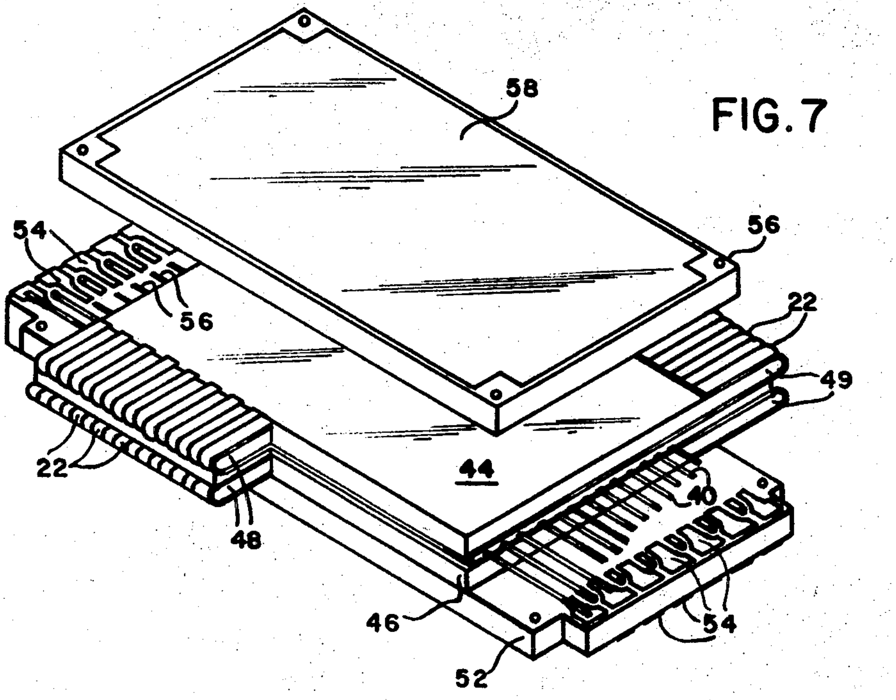
FIG. 7 is an exploded isometric view generally similar to the views of FIGS. 3 and 6, but showing the final stage manufacturing steps.

A curable thermosetting film adhesive 25, such as a Stage B, or semicured epoxy, preferably having a thickness of 0.001 inch or less, is placed on top of the array of lands 36 to extend over the grooves 42 in such a manner so as not to engage the memory wires 40. The opposed tab portions 26 and 28 of the flexible sheet are then folded over upon the film adhesive 25 carefully aligned so that the conductive strips 22 remain in registration, each one being folded directly back upon itself, i.e., so that the strips face each other and are in parallel alignment. The film adhesive 25 is then conventionally cured, such as with 300° F. temperature and 150 pounds per square inch pressure for 20 minutes, to secure the folded tabs to the lands 36. The film adhesive 25 has preset dimensions that will not significantly change during the curing process and accordingly will not significantly deform or flow from its initial form to adhere to the memory wires 40. Parmacel P–18 and Bloomingdale FM–1044R film adhesives have been found to be satisfactory. In effect, the memory wires are loosely positioned in a tunnellike passageway 41 defined by the insulating coating 24, the sides of the lands 36 and the portion of the film adhesive 25 extending over the grooves 42. It should be noted in the case where the plated wire memory device is made with the use of separate insulating sheets (including the conductive strips) rather than folding the tab portions 26 and 28, the upper insulating coating 24 (as viewed in FIG. 4) can be eliminated since the film adhesive will also function as an insulator.

It should be noted that this method of making the plated wire memory devices is particularly adapted for mass production. The need for the removable filaments and the subsequent insertion of the fragile memory wires is eliminated. The memory wires are simply placed into the open grooves 42 and the memory bonded and assembled with the magnetic filaments in place. As a result, the problems associated with the step of inserting the fragile memory wires into the small passageways in the memory unit are avoided, such as for example, the possibility of stressing or straining the memory wire and thereby disturbing its magnetic characteristics, or the possibility of scratching the thin insulating coating between the memory wire and the word strap thereby creating potential short circuit connections.

After the curing step, stiffening plates 44 and 46 of an insulating material such as, for example, glass fiber reinforced epoxy resin, are then cemented on the opposite sides of the structure. The stiffening plates are coextensive with the folded structure, except that their tab portions 48 and 49 are shorter than the tab portions 26 and 28 of the flexible sheet. Those parts of the tab portions 26 and 28 of the flexible sheet that extend beyond the tab portions 48 and 49 of the stiffening plates are then folded back over and cemented to the stiffening plates to expose the conductive strips 22 for connection to external circuitry. The insulating coating 24 may be readily removed from the folded back portions of the conductive strips 22, which then form an array of terminal tabs that can be mated with a springfinger receptacle (not shown).

The memory wires 40 are electrically connected as by soldering to the terminal pads 54 on an insulating board 52. Another insulating board 56 is placed over the stiffening plate 44 and is secured to the board 52. The board 56 extends over the connections of the memory wires 40 to the pads 54 to provide a protective cover. A copper shield 58 is plated on exterior sides of the insulating boards 52 and 56 to shield the memory device from stray electrical signals. Connections may be made as desired to the conductive strips 22 carried by the insulating sheet material, preferably by so-called plug-in arrangements. Each one of the conductive strips 22 constitutes a single turn coil around each of the memory wires.

In some cases it is desirable to insert the memory wires after a portion of the memory device has been completed. For example, in the case of double layer plated wire memory devices, the memory wires can be bent to form a U-shaped element and provide a continuous connection between the two stacks or layers of shielded memory planes. In this case, the memory planes include tunnellike passageways in parallel registration and the U-shaped memory wire is inserted simultaneously in both memory planes.

Figure 5:
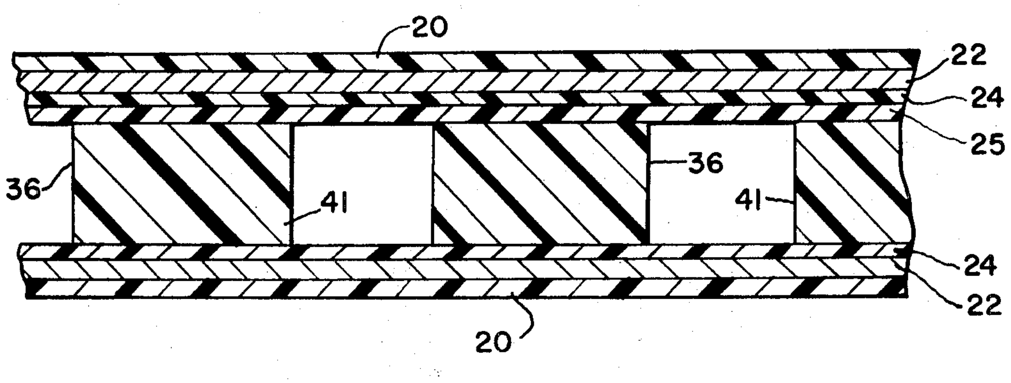
FIG. 5 is a cross-sectional view, on an enlarged scale, of the laminate shown in FIG. 3 with the memory wires removed.

In accordance with a second embodiment of the invention, passageways are formed by the assembly process and the memory wires 40 are inserted into the memory device after assembly. In this case, the film adhesive 25 is placed over the lands 36 and extends over the empty grooves 42. The top tabs 26 and 28 are folded over as mentioned above and the assembly is completed by bonding as previously described. Since the dimensions of the film epoxy layer do not change substantially during the curing process, the grooves 42 will remain empty as illustrated in FIG. 5 to provide the passageways 41. The memory wires can be inserted into the passageways 41 before or after the stiffening plates 44 and 46 are cemented to the structure.

Figure 8:
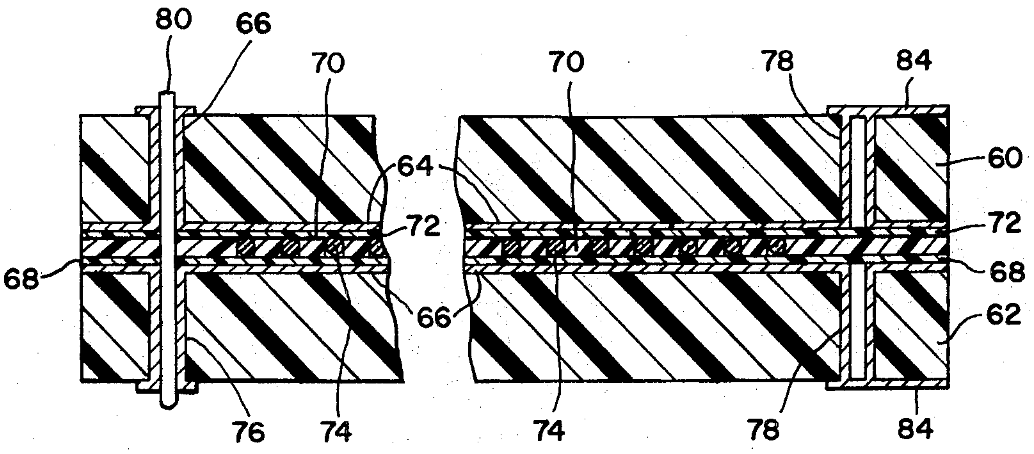
FIG. 8 is a fragmentary cross-sectional view on an enlarged scale of a plated wire memory device according to a modified form of the invention.

The embodiment shown in FIG. 8 includes two relatively rigid printed circuit boards 60 and 62, each including the conductive strips 64 and 66, rather than the flexible sheet material 20 described in connection with the embodiment shown in FIGS. 1 to 7. The board 62 has an insulating layer 68 onto which the lands 70 are bonded in a manner as previously described. The board 60 is bonded to the lands 70 by a film adhesive 72 as set forth above. The memory wires 74 can be inserted into the passageways or grooves between the lands 70 before or after the board 60 is bonded to the lands 70 in a manner as mentioned above.

With the rigid boards 60 and 62, it is not possible to bend the conductive strips 64 and 66 back over as in the other embodiments to form terminal pads for electrical connections to the conductive strips. Such connections are effected in this embodiment of the invention by so-called plate-through techniques. Holes 76 and 78 are drilled or punched through the rigid insulating sheets 60 and 62 extending through the conductive strips 64 and 66, one hole 76 and 78 at each end of each conductive strip. The edge portions of the sheet 60 and 62 are immersed in an electroplating bath such as, for example, a silver plating bath, and electroplated to form conductive extensions of the strips 64 and 66 through the holes 76 and 78, to which connection may be made in any desired way. At one end of each strip 64 and 66, it is normally desired to connect it to the strip in registration with it on the opposite insulating sheet. This is done simply by dropping a conductor 80 through the two holes 76 and soldering the conductor to the plated extensions.

The construction is otherwise generally similar to the embodiment shown in FIGS. 1 to 7, except that the stiffening boards 44 and 46 may be omitted, and the terminal pads 84 secured on the outer surfaces of the main rigid sheets 60 and 62 may constitute the card edge connectors. It is believed that it will usually be desirable to mount the assembly shown in FIG. 8 on a separate base plate generally similar to the plate 52 shown in FIG. 7.

What is claimed is:

1. A method of making a magnetic memory device comprising:

providing an array of parallel conductive strips supported by and bonded to a flexible sheet of insulating material;

covering the strips with a thin layer of an insulating material;

casting an array of lands upon said layer of insulating material normally to said conductive strips over a selected area of the insulating sheet, the lands being bonded to the layer of insulating material and defining grooves therebetween;

placing magnetic memory wires into the grooves between the lands, said wires having a cross-sectional dimension less than the height of said lands;

placing a thin sheet of curable adhesive having predetermined dimensions directly on the lands so that it extends across the grooves without engaging said memory wires, said sheet of adhesive having the properties wherein its dimensions do not change significantly due to curing;

folding a portion of the sheet material adjacent to the selected area over the sheet of adhesive keeping each one of the strips in register with itself, and curing the sheet of adhesive to bond the folded sheet material to the lands.

2. A method of making a magnetic memory device according to claim 1 wherein said sheet of adhesive is a semicured epoxy.

3. A method of making a magnetic memory device as defined in claim 2 including the step of coating said memory wires with a release agent prior to placing into said grooves.

4. A method of making a magnetic memory device as defined in claim 2 including the step of placing a release agent into said grooves prior to placing said memory wires into said grooves.

5. A method of making a magnetic memory device comprising:

providing an array of parallel conductive strips supported by and bonded to a flexible sheet of insulating material;

covering the strips with a flexible thin layer of an insulating material;

casting an array of lands upon the thin layer of insulating material extending normally to said conductive strips over a selected area of the insulating sheet, the lands being bonded to the thin layer of insulating material and defining grooves therebetween;

placing a thin sheet of curable adhesive having predetermined dimensions directly on said lands so that it extends across the grooves to define passageways for receiving magnetic memory wires, the sheet of adhesive having the properties wherein its dimensions do not significantly change due to curing;

folding a portion of the sheet material adjacent to the selected area over the sheet of adhesive keeping each one of the strips in register with itself;

curing said sheet of adhesive to bond said folded sheet material to said lands, and inserting magnetic memory wires into the passageways.

6. A method of making a magnetic memory device as defined in claim 5 wherein said sheet of adhesive is a semicured epoxy film.

7. Method of making a magnetic memory device comprising:

providing two substantially identical rigid insulating sheets, each having an array of straight and parallel conductive strips on one surface and conductive pads on the opposite surface in registration with end portions of the conductive strips;

electrically connecting the pads to the respective strips in register with them;

coating the strips on at least one of the insulating sheets with a thin layer of an adherent insulating material;

casting an array of insulating lands upon the thin layer of insulating material on said one of the insulating sheets, the lands extending normally to the strips and bonded to said insulating material;

placing magnetic memory wires in the grooves between the lands, said filaments having a cross-sectional dimension less than the height of said lands;

placing a thin sheet of curable adhesive having predetermined dimensions directly on said lands so that it extends across the grooves without engaging said memory wires, said sheet of adhesive having the properties wherein its dimensions do not change significantly due to curing;

placing the other insulating sheet on the sheet of adhesive with the conductive strips on the two insulating sheets being in parallel registration, and curing said sheet of adhesive to bond said other insulating sheet to said lands.

8. A method of making a magnetic memory as defined in claim 7 wherein said sheet of adhesive is a semicured epoxy film.

9. A method of making a magnetic memory device comprising:

providing two substantially identical insulating sheets, each having an array of straight and parallel conductive strips on one surface and conductive pads on the opposite surface in registration with end portions of the conductive strips;

electrically connecting the pads to the respective strips in register with them;

coating the strips on at least one of the insulating sheets with a thin layer of an adherent insulating material;

casting an array of insulating lands upon the thin layer of insulating material on said one of the insulating strips, the lands extending normally to the strips and bonded to said insulating material defining grooves therebetween;

placing a thin sheet of curable adhesive having predetermined dimensions directly on said lands so that it extends across the grooves to define passageways for receiving magnetic memory wires, said sheet of adhesive having the properties wherein its dimensions do not significantly change due to its curing process;

placing the other insulating sheet on the sheet of adhesive with the conductive strips on the two insulating sheets being in parallel registration;

curing said sheet of adhesive to bond said other insulating sheet to said lands, and inserting magnetic memory wires into the passageways.

10. A method of making a magnetic memory as defined in claim 9 wherein said sheet of adhesive is a semicured epoxy film.

* * * * *